United States Patent
Wu et al.

(10) Patent No.: US 10,529,111 B1
(45) Date of Patent: Jan. 7, 2020

(54) FACIAL RECOGNITION METHOD FOR VIDEO CONFERENCE AND SERVER USING THE METHOD

(71) Applicant: NANNING FUGUI PRECISION INDUSTRIAL CO., LTD., Nanning (CN)

(72) Inventors: Chun-Te Wu, New Taipei (TW); Zhi-Gang Shi, Nanning (CN); Dong-Lin Liu, Nanning (CN); Wen Meng, Nanning (CN); Yu-Qiang Zhong, Nanning (CN)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 0 days.

(21) Appl. No.: 16/419,607

(22) Filed: May 22, 2019

(30) Foreign Application Priority Data

May 16, 2019 (CN) .......................... 2019 1 0408777

(51) Int. Cl.
| | |
|---|---|
| *G06T 13/20* | (2011.01) |
| *G06K 9/00* | (2006.01) |
| *H04N 7/15* | (2006.01) |
| *G10L 21/10* | (2013.01) |
| *G06T 13/40* | (2011.01) |
| *G10L 21/0356* | (2013.01) |

(52) U.S. Cl.
CPC ........ *G06T 13/205* (2013.01); *G06K 9/00302* (2013.01); *G06T 13/40* (2013.01); *G10L 21/0356* (2013.01); *G10L 21/10* (2013.01); *H04N 7/157* (2013.01); *G10L 2021/105* (2013.01)

(58) Field of Classification Search
CPC ....... H04N 7/157; G06T 13/205; G06T 13/40; G06K 9/00302; G10L 21/0356; G10L 21/10
See application file for complete search history.

(56) References Cited

U.S. PATENT DOCUMENTS

| | | | |
|---|---|---|---|
| 9,928,634 B2 * | 3/2018 | Cao .......................... | G06F 3/017 |
| 2010/0008639 A1 * | 1/2010 | Greenberg ............. | G06Q 10/06 386/248 |
| 2010/0302138 A1 * | 12/2010 | Poot ........................ | G06F 3/011 345/156 |

(Continued)

*Primary Examiner* — Jefferey F Harold
*Assistant Examiner* — Mustafizur Rahman
(74) *Attorney, Agent, or Firm* — ScienBiziP, P.C.

(57) ABSTRACT

A facial recognition method for video conferencing requiring a reduced bandwidth and transmitting video and audio frames synchronously first determines whether a 3D body model of a first user at a local end has been currently retrieved or is otherwise retrievable from a historical database. Multiple audio frames of first user are collected and audio frequency at a specific range are filtered out. An envelope curve of the first audio frames and multiple attacking time periods and multiple releasing time periods of the envelope curve is calculated and correlated with lip movements of first user. Information packets of same and head-rotating and limb-swinging images of the first user are transmitted to a remote second user so that the 3D body model can simulate and show lip shapes and other movement of the first user.

8 Claims, 5 Drawing Sheets

(56) References Cited

U.S. PATENT DOCUMENTS

| | | | | |
|---|---|---|---|---|
| 2011/0175801 A1* | 7/2011 | Markovic | ............... | G06F 3/017 345/156 |
| 2011/0193939 A1* | 8/2011 | Vassigh | ................... | G06F 3/011 348/46 |
| 2012/0319946 A1* | 12/2012 | El Dokor | ................. | G06F 3/011 345/156 |
| 2012/0327177 A1* | 12/2012 | Kee | ......................... | H04N 7/15 348/14.08 |
| 2014/0099004 A1* | 4/2014 | DiBona | .................... | H04N 7/15 382/118 |
| 2014/0176663 A1* | 6/2014 | Cutler | ....................... | G06T 7/50 348/14.07 |
| 2014/0226000 A1* | 8/2014 | Vilcovsky | ............... | G06F 3/017 348/77 |
| 2014/0267548 A1* | 9/2014 | Yee | ......................... | G06F 3/017 348/14.03 |
| 2016/0050391 A1* | 2/2016 | Schultz | .................. | H04N 7/144 348/14.07 |
| 2016/0080662 A1* | 3/2016 | Saban | ..................... | G02B 5/08 348/77 |

\* cited by examiner

US 10,529,111 B1

FACIAL RECOGNITION METHOD FOR VIDEO CONFERENCE AND SERVER USING THE METHOD

FIELD

The subject matter herein generally relates to communication technologies, especially to a facial recognition method for video conference and a server using the method.

BACKGROUND

A video conference system based on a H.323 protocol or a Session Initiation Protocol (SIP) applies image compression methods comprising a H.261 protocol, a H.263 protocol, a H.264 protocol/Advanced Video Coding (AVC), H.264 High Profile, H.264 Scalable Video Coding (SVC) and Real Time Video (RTV) that is applicable in a restricted network environment.

Problems can occur in a lower bandwidth network or during a specific busy time period. Accordingly, when a higher quality is set for the video conference system, a transmission delay or frame per second (FPS) sequencing less than a specific value might occur under real-time image transmission. In contrast, when a lower quality is set for the video conference system to maintain fluent video streaming, poor quality of image transmission may be obvious for users. In addition, increased time for network delay and asynchronization for video and audio frames may also be detected. Therefore, there is room for improvement within the art.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout the several views. Implementations of the present technology will now be described, by way of embodiments, with reference to the attached figures, wherein.

DETAILED DESCRIPTION

Figure 1:
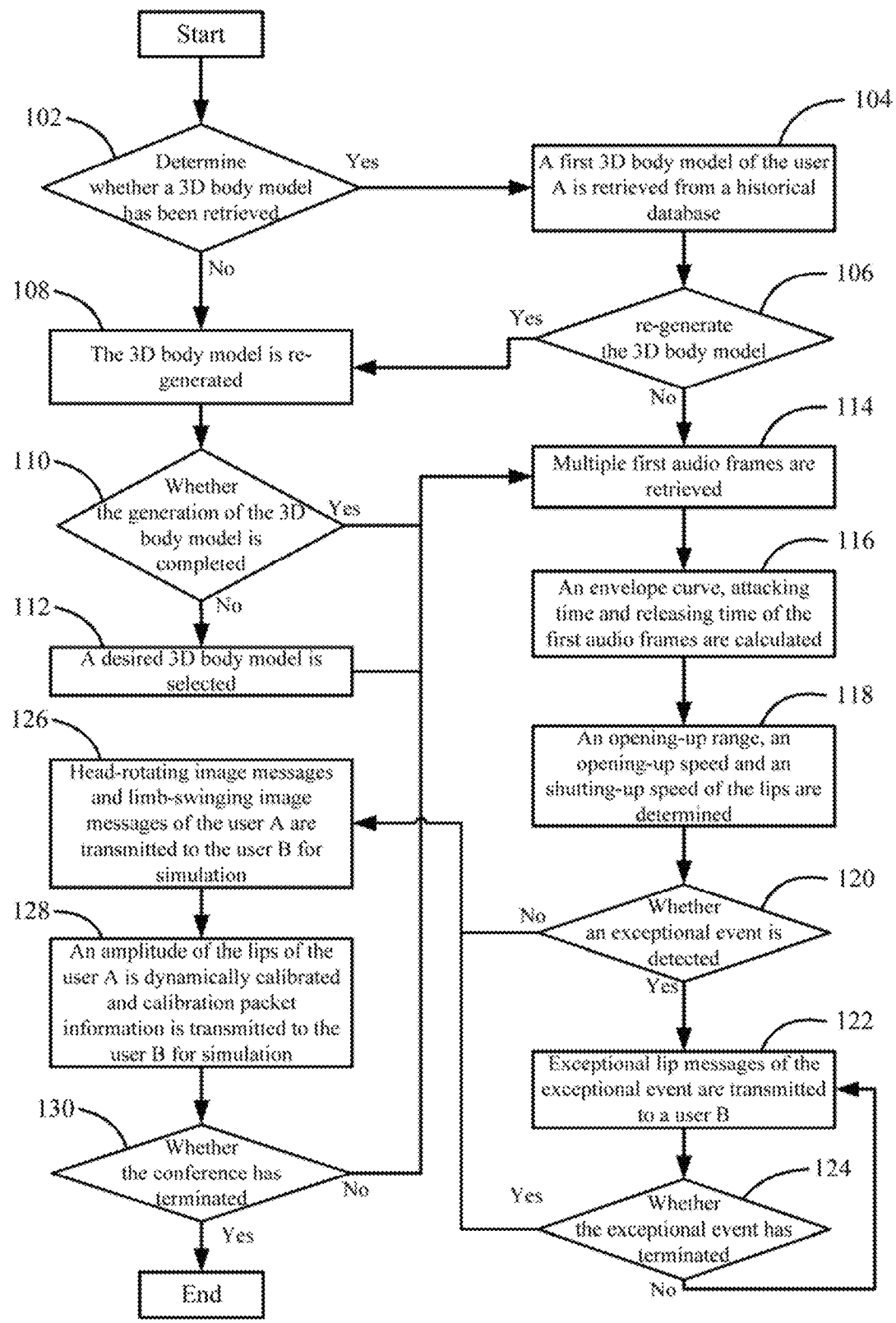
FIG. 1 is a flowchart of an embodiment of a facial recognition method for video conferencing.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "comprising," when utilized, means "including, but not necessarily limited to"; it specifically indicates open-ended inclusion or membership in the so-described combination, group, series, and the like.

An embodiment of a facial recognition method generates facial models using UV mapping. The UV mapping is the process of projecting a 2D image onto a 3D model's surface for texture mapping. The letters "U" and "V" denote the axes of the 2D texture because "X", "Y" and "Z" are already used to denote the axes of the 3D object in model space.

FIG. 1 shows a flowchart of an embodiment of a facial recognition method for video conferencing, applying to a video conference device or a video conference server.

In Block 102, it is determined whether a 3D body model of a user A at a local end has been retrieved.

Figure 2A:
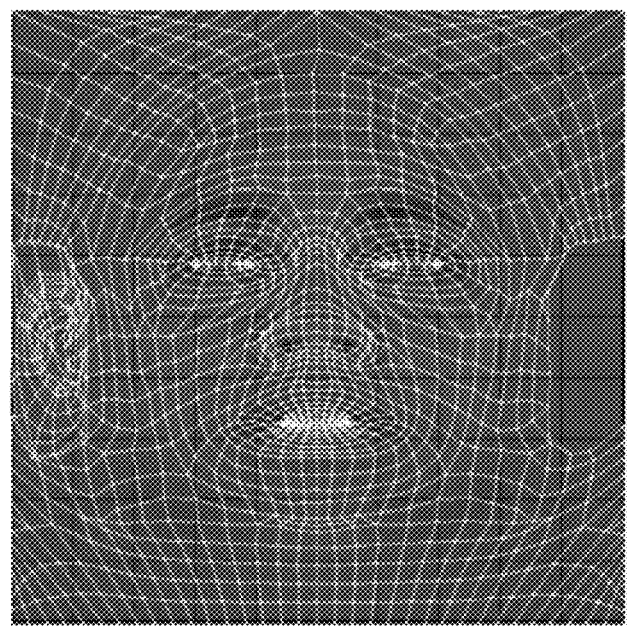
FIG. 2A is a schematic diagram of facial UV textures.
Figure 2B:
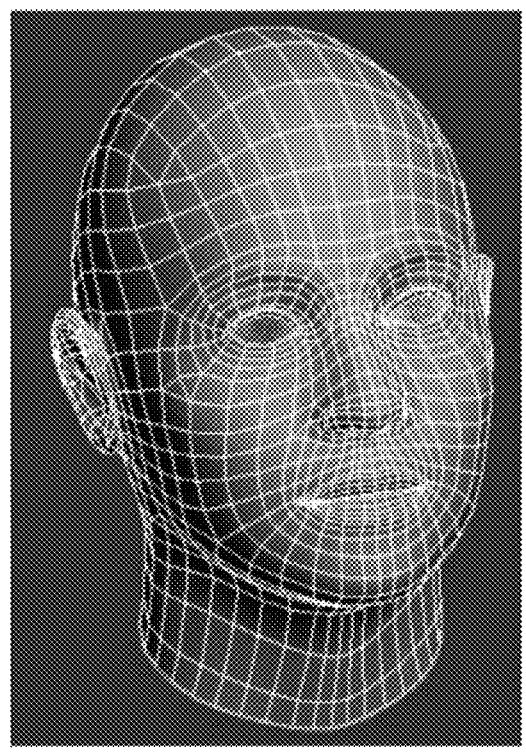
FIG. 2B is a schematic diagram of a 3D head model.

In Block 104, if the 3D body model of the user A has been retrieved, a first 3D body model of the user A is retrieved from a historical database. The first 3D body model comprises UV textures of a first face (as shown in FIG. 2A), a first 3D head model (as shown in FIG. 2B) and a first 3D hair model (not shown) of the user A.

In Block 106, it is determined whether the 3D body model needs to be re-generated. If not, the process proceeds to Block 114.

In Block 108, if the 3D body model needs to be re-generated or the 3D body model of the user A has not been retrieved, a second face, a second 3D head model, and a second 3D hair model of the user A are retrieved using an image processing method to generate a second 3D body model of the user A.

In Block 110, it is determined whether the process of generating the 3D body model is completed. If yes, the process proceeds to Block 114.

In Block 112, if the process of generating the 3D body model has not been completed, this signifies that user A is not satisfied with the currently generated 3D body model. A desired 3D body model can be selected from the historical database according to an instruction input by the user A.

In Block 114, multiple audio frames, for example, multiple first audio frames, are retrieved according to voice of the user A. Audio frequency at a specific range, for example, 50 Hz~650 Hz, is filtered out from the multiple first audio frames.

Figure 3A:
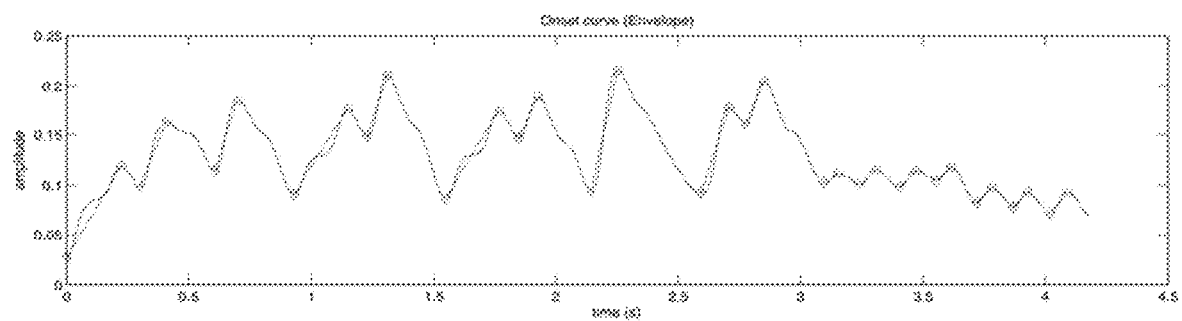
FIG. 3A is a schematic diagram of an embodiment of an envelope curve and attacking time periods of the envelope curve.
Figure 3B:
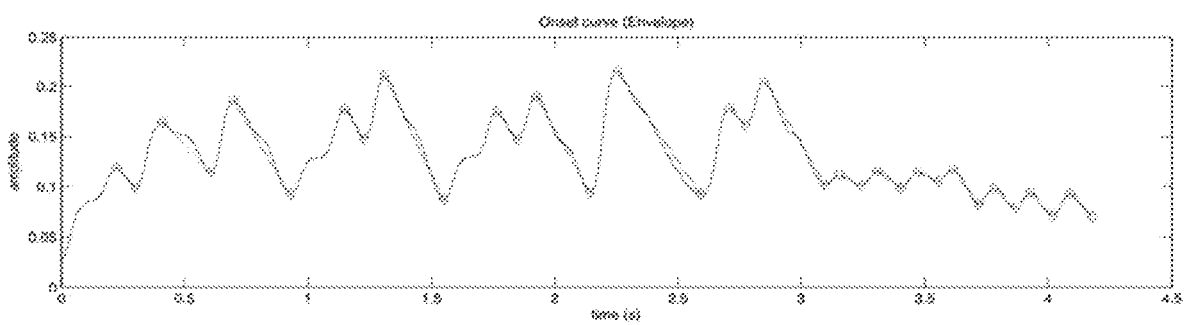
FIG. 3B is a schematic diagram of an embodiment of an envelope curve and releasing time periods of the envelope curve.

In Block 116, an envelope curve of the first audio frames is calculated and multiple attacking time periods and multiple releasing time periods of the envelope curve are calculated, as shown in FIG. 3A and FIG. 3B.

In Block 118, an opening-up range of lips of the user A is determined according to amplitudes of the envelope curve. An opening-up speed of the lips is determined according to each of the attacking time periods, and a shutting-up speed of the lips is determined according to the releasing time periods.

Figure 4A:
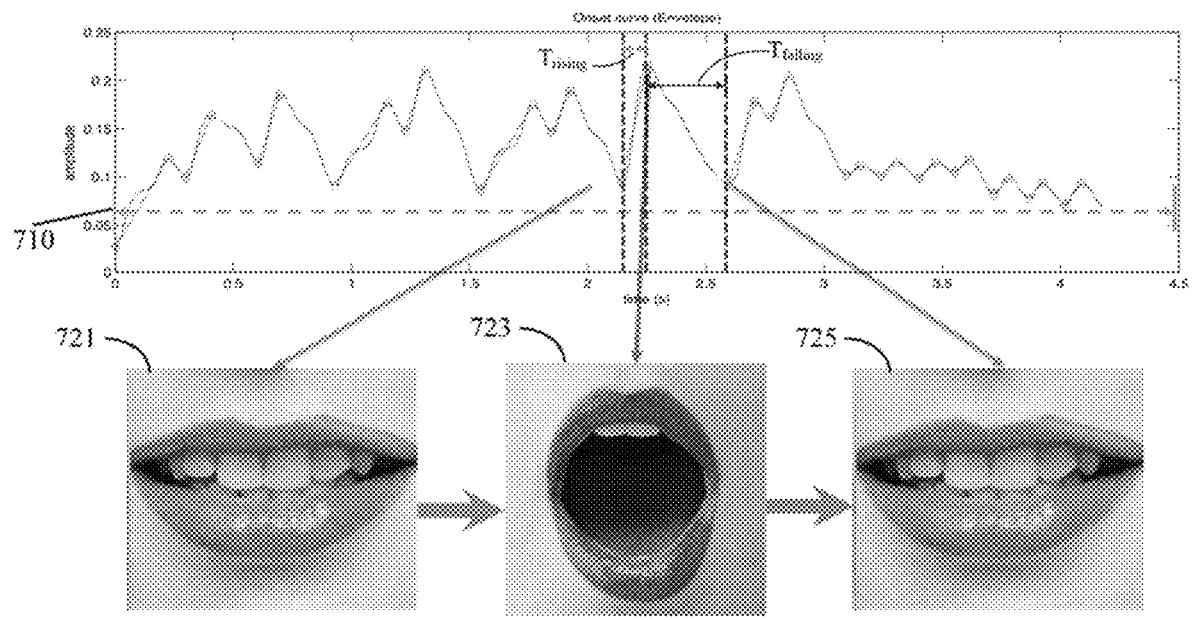
FIG. 4A is a schematic diagram of an embodiment of amplitude variations of lips.

As shown in FIG. 4A, $T_{rising}$ indicates an opening-up time of the lips, while $T_{falling}$ indicates a shutting-up time of the lips. Symbol 710 indicates a threshold value taken as the lips being completely closed. An amplitude not at the threshold value indicates the lips are incompletely closed. Symbol 721 to symbol 723 indicates that the lips are incompletely closed and then start to open up. Symbols 721 to symbol 723 indicate that the lips are completely open and then start to close.

Figure 4B:
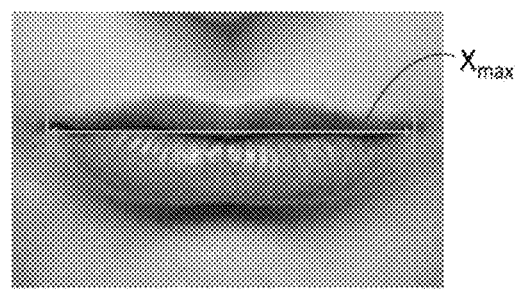
FIG. 4B is a schematic diagram of an embodiment of the lips closed.
Figure 4C:
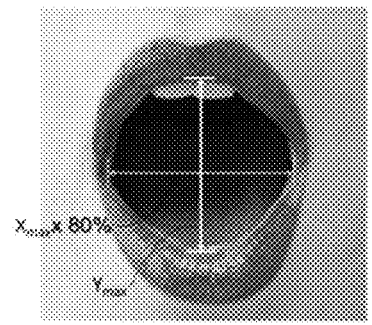
FIG. 4C is a schematic diagram of an embodiment of the lips opening up to a maximum degree.

FIG. 4B shows the lips normally shut up, the X axis indicates the width of the lips as being at the maximum value, $X=X_{max}$, while the Y axis indicates that the height of the lips is zero. FIG. 4C shows the lips completely opened and that the width is equal to 80% of the maximum value ($X=X_{max}\times 80\%$). The height is equal to the maximum value, $Y=Y_{max}$.

In Block 120, it is detected in real-time whether an exceptional event representing no voice with changes of the aspects of the lips for the user A is detected.

Figure 5:
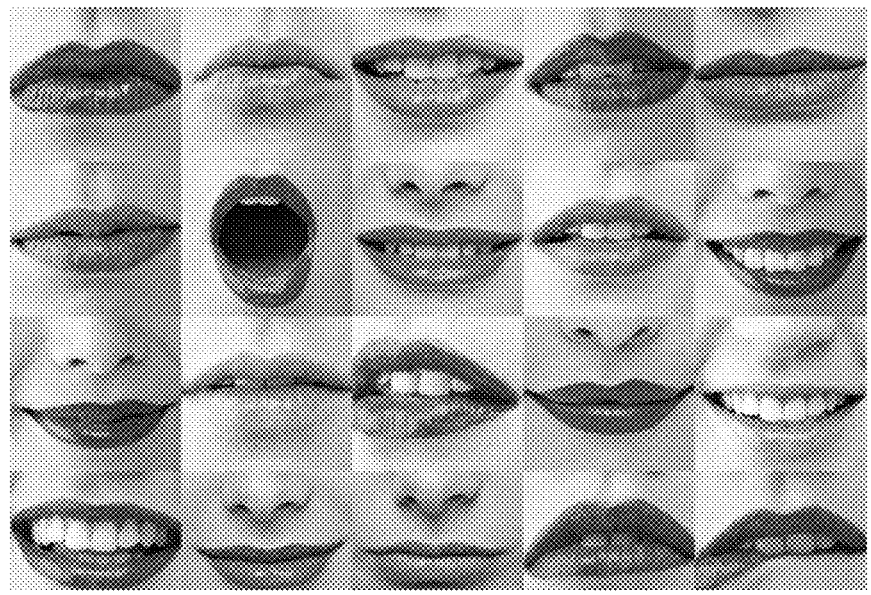
FIG. 5 are schematic diagrams of an embodiment of different lips for various moods with no voice.

FIG. 5 shows different lips for various moods with no voice, the moods comprising surprised, thoughtful, smiling, open-mouthed laughter, lip-biting, and so on.

In Block 122, when the exceptional event is detected, exceptional lip messages of the exceptional event are transmitted to a user B at the remote end, so that the 3D body model simulates the shape of the lips of the user A.

In Block 124, it is determined whether the exceptional event has terminated.

In Block 126, if there is no exceptional event or the exceptional event is terminated, head-rotating image messages and limb-swinging image messages of the user A are transmitted to the user B at the remote end, so that the 3D body model simulates and shows lip shapes and behaviors of the user A according to the head-rotating and the limb-swinging.

In Block 128, an amplitude of the lips of the user A is dynamically calibrated according to an opening range, an opening speed and a shutting speed of the lips of the user A. The calibration packet information is then transmitted to the user B at the remote end, so that the 3D body model simulates and shows lip shapes of the user A according to the calibration packet information.

The dynamic calibration operation in Block 128 further comprises the following processing operations.

The maximum lip-width value of the 3D body model is taken as a basic unit to detect an envelope curve of voice of the first user in real-time, and a percentage of the width of the lips closed and the maximum value is calculated. The images of lips are represented by pixels exceeding a threshold peak value.

The width X and height Y of the lips and time stamps of envelopes of the voice of the first user are packaged and transmitted to the user B at the remote end.

The head-rotating image messages and the limb-swing image messages of the user A are detected in real-time, these determine whether movements of the user A are detected. If movements of the user A are detected, coordinate messages of the head and the limb of the user A are transmitted to the user B at the remote end.

Figure 6:
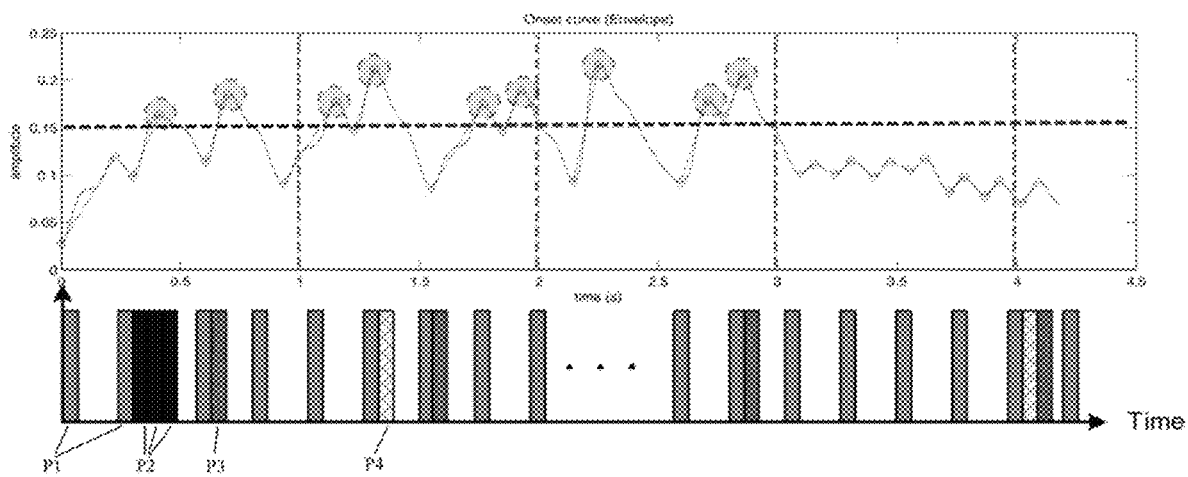
FIG. 6 is a schematic diagram of an embodiment of dynamic calibration of the lips.

As shown in FIG. 6, P1 indicates VoIP packets of the user A, P2 indicates facial image packets with high resolution, P3 indicates packets generated by irregularly calibrating the amplitude of the opening-up lips, and P4 indicates packets of the head-rotating messages and the limb-swing messages of the user A.

In Block 130, it is determined whether the conference has terminated. If not, the process proceeds to Block 114.

An embodiment of the facial recognition method for video conference saves amount of bandwidth used in a video conference, and improves user experience insofar as video frames and audio frames which are transmitted to a remote user are transmitted synchronously. Additionally, virtual reality (VR)/augmented reality (AR) devices enables multiple users to join in the same conference.

An embodiment of the facial recognition method for video conference can also apply in a video conference device or a video conference server. The video conference device or the video conference server comprises one or more processing units (not shown) and/or more modules or units to implement the facial recognition method of the present embodiments. The one or more functional modules can include computerized code in the form of one or more programs that are stored in the storage unit (not shown), and executed by the processor (not shown) to provide functions of the video conference server (not shown). The storage unit (not shown) can be a dedicated memory, such as an EPROM, or a flash memory.

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

The embodiments shown and described above are only examples. Many details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail. It is believed that the embodiments and their advantages will be understood from the foregoing description, and it will be apparent that various changes may be made thereto without departing from the scope of the disclosure or sacrificing all of its advantages, the embodiments hereinbefore described merely being illustrative embodiments of the disclosure.

What is claimed is:

1. A facial recognition method for video conference, applying to a video conference device or a video conference server, the method comprising:
   determining whether a 3D body model of a first user at a local end has been retrieved;
   if the 3D body model of the first user has been retrieved, retrieving a first 3D body model of the first user from a historical database;

retrieving multiple audio frames according to voice of the first user and filtering out multiple first audio frames with audio frequency at a specific range from the audio frames;

calculating an envelope curve of the first audio frames and calculating multiple attacking time periods and multiple releasing time periods of the envelope curve;

determining an opening-up range of lips of the first user according to amplitudes of the envelope curve, determining an opening-up speed of the lips according to each of the attacking time periods, and determining an shutting-up speed of the lips according to each of the releasing time periods; and transmitting calibration packet information, head-rotating image messages, and limb-swing image messages of the first user to a second user at a remote end, so that the 3D body model simulates and shows lip shapes and behaviors of the first user according to the calibration packet information, the head-rotating image messages, and the limb-swing image messages.

2. The facial recognition method of claim 1, further comprising:

taking the maximum value of the width of the lips of the 3D body model as a basic unit to detect an envelope curve of voice of the first user in real-time; and calculating a percentage of the width of the lips closed and the maximum value, wherein the lips represent lip image pixels exceeding a threshold peak value.

3. The facial recognition method of claim 2, further comprising:

packaging and transmitting the width and a height of the lips and time stamps of envelopes of the voice of the first user to the second user at the remote end.

4. The facial recognition method of claim 1, further comprising:

Detecting, in real-time, whether an exceptional event representing no voice with changes of the lips for the first user is detected; and when the exceptional event is detected, transmitting exceptional lip messages of the exceptional event to the second user at the remote end, so that the 3D body model simulates the lip shapes of the first user.

5. A video conference server, comprising:

at least one processor;

a non-transitory storage medium system coupled to at least the one processor and configured to store one or more programs that are to be executed by the at least one processor, the one or more programs comprises instructions for:

determining whether a 3D body model of a first user at a local end has been retrieved;

if the 3D body model of the first user has been retrieved, retrieving a first 3D body model of the first user from a historical database;

retrieving multiple audio frames according to voice of the first user and filtering out multiple first audio frames with audio frequency at a specific range from the audio frames;

calculating an envelope curve of the first audio frames and calculating multiple attacking time periods and multiple releasing time periods of the envelope curve;

determining an opening-up range of lips of the first user according to amplitudes of the envelope curve, determining an opening-up speed of the lips according to each of the attacking time periods, and determining an shutting-up speed of the lips according to each of the releasing time periods; and transmitting calibration packet information and head-rotating image messages and limb-swing image messages of the first user to a second user at a remote end, so that the 3D body model simulates and shows lip shapes and behaviors of the first user according to the calibration packet information, the head-rotating image messages and the limb-swing image messages.

6. The video conference server of claim 5, wherein the one or more programs further comprises instructions for:

taking the maximum value of the width of the lips of the 3D body model as a basic unit to detect an envelope curve of voice of the first user in real-time; and calculating a percentage of the width of the lips closed and the maximum value, wherein the lips represent lip image pixels exceeding a threshold peak value.

7. The video conference server of claim 6, wherein the one or more programs further comprises instructions for:

packaging and transmitting the width and a height of the lips and time stamps of envelopes of the voice of the first user to the second user at the remote end.

8. The video conference server of claim 6, wherein the one or more programs further comprises instructions for:

Detecting, in real-time, whether an exceptional event representing no voice with changes of the lips for the first user is detected; and when the exceptional event is detected, transmitting exceptional lip messages of the exceptional event to the second user at the remote end, so that the 3D body model simulates the lip shapes of the first user.

* * * * *